(12) United States Patent
Liu et al.

(10) Patent No.: US 12,553,807 B2
(45) Date of Patent: *Feb. 17, 2026

(54) ROCK TENSILE DAMAGE TESTING SYSTEM COUPLED WITH COMPLEX LOADING CONDITION

(71) Applicant: Sichuan University, Sichuan (CN)

(72) Inventors: Jianfeng Liu, Sichuan (CN); Heping Xie, Sichuan (CN); Lu Wang, Sichuan (CN); Yougang Cai, Sichuan (CN); Lina Ran, Sichuan (CN); Chunping Wang, Sichuan (CN); Gan Feng, Sichuan (CN); Hua Li, Sichuan (CN); Xiangchao Shi, Sichuan (CN); Jianliang Pei, Sichuan (CN); Huining Xu, Sichuan (CN); Xiaozhang Lei, Sichuan (CN); Jianhui Deng, Sichuan (CN)

(73) Assignee: SICHUAN UNIVERSITY, Chengdu (CN)

( * ) Notice: Subject to any disclaimer, the term of this patent is extended or adjusted under 35 U.S.C. 154(b) by 289 days.

This patent is subject to a terminal disclaimer.

(21) Appl. No.: 18/464,364

(22) Filed: Sep. 11, 2023

(65) Prior Publication Data

US 2024/0068919 A1    Feb. 29, 2024

(30) Foreign Application Priority Data

Aug. 30, 2022   (CN) .......................... 202211052300.5

(51) Int. Cl.
   *G01N 3/12*    (2006.01)
   *G01N 3/16*    (2006.01)

(52) U.S. Cl.
   CPC ............... *G01N 3/12* (2013.01); *G01N 3/165* (2013.01); *G01N 2203/0017* (2013.01);
   (Continued)

(58) Field of Classification Search
   CPC .. G01N 3/12; G01N 3/08; G01N 3/04; G01N 3/02; G01N 3/06; G01N 3/165;
   (Continued)

(56) References Cited

U.S. PATENT DOCUMENTS 4,080,824 A * 3/1978 Starks ...................... G01N 3/04
                                                    73/859
5,060,521 A * 10/1991 Cole ........................ G01N 3/04
                                                    73/857

(Continued)

FOREIGN PATENT DOCUMENTS

CN      106680078 A     5/2017
CN      206248434 U     6/2017
(Continued)

*Primary Examiner* — Jonathan M Dunlap
(74) *Attorney, Agent, or Firm* — NKL Law; Allen Xue

(57) ABSTRACT

A rock direct tensile test platform suitable for all material test machines includes a support frame. A top of the support frame is fixed with a top plate, and a bearing plate is provided above the top plate. The bearing plate is provided with a plurality of vertical force transferring rods. The force transferring rods vertically penetrate through the top plate and have a sliding fit with the top plate. Lower ends of the force transferring rods are provided with a tensile base. A top of the tensile base is provided with a lower clamp holder. A bottom of the top plate is provided with an upper clamp holder, and a clamp center of the upper clamp holder coincides with a clamp center of the lower clamp holder.

9 Claims, 6 Drawing Sheets

(52) U.S. Cl.
CPC ............... *G01N 2203/0037* (2013.01); *G01N 2203/0206* (2013.01); *G01N 2203/0256* (2013.01)

(58) Field of Classification Search
CPC ... G01N 2203/0017; G01N 2203/0037; G01N 2203/0206; G01N 2203/0256; G01N 2203/0003; G01N 2203/0405
See application file for complete search history.

(56) References Cited

U.S. PATENT DOCUMENTS

| | | | | | |
|---|---|---|---|---|---|
| 5,377,549 | A | * | 1/1995 | Werner | G01N 3/04 73/860 |
| 5,948,994 | A | * | 9/1999 | Jen | G01N 3/08 73/796 |

FOREIGN PATENT DOCUMENTS

| | | | | | |
|---|---|---|---|---|---|
| CN | 108287110 | A | * | 7/2018 | G01N 3/10 |
| CN | 112649290 | A | * | 4/2021 | G01N 3/04 |
| CN | 103822830 | A | | 5/2024 | |

* cited by examiner

ROCK TENSILE DAMAGE TESTING SYSTEM COUPLED WITH COMPLEX LOADING CONDITION

FIELD OF THE INVENTION

The present invention belongs to the technical field of rock tensile test, and in particular relates to a rock direct tensile test platform and method universally suitable for all material test machines.

DESCRIPTION OF THE RELATED ART

A test of three kinds of mechanical parameters of rocks, such as crush resistance, tensile strength and shear strength, is indispensable in all rock engineering constructions. A tensile test of rock samples is an important means to understand tensile load bearing capacity of the rock. As one of basic mechanical parameters in engineering constructions, a tensile strength value of the rock is very important for engineering design calculation. At present, there are two main methods used to determine the tensile strength value of the rock: an indirect tensile method and a direct tensile method.

The indirect tensile method is also known as a Brazilian splitting method. Because of its simple operation and wide universality, it can be implemented on all conventional material compression mechanical test machines, and it is also the only recommended test method in a national standard "Engineering Rock Mass Test Method Standard". Although the Brazilian splitting method is a widely recommended test method in ISRM and "Engineering Rock Mass Test Method Standard", specific test methods are different and can be divided into direct loading methods, pad strip methods and arc loading methods.

The recommended method in the "Engineering Rock Mass Test Method Standard" is to add a metal pad strip between a specimen and an indenter, and is to add a cork pad between the specimen and the indenter for a soft rock. Although it is to ensure that the indenter transfers a linear concentrated load to an end of the specimen, it still does not solve the problem of brittle rock ends being brittle, and a research shows that the tensile strength of the rock obtained by this method is small.

In the ISRM, it is recommended to set a contact point between the indenter and the specimen as an arc. Although this method ensures that the end of the specimen is an arc compression zone and reduces a risk of breakage of the end of the specimen to a certain extent, this method requires an arc of the indenter to match a magnitude of the sample, which not only has low universality, but also leads to a high tensile strength. Although this method is simple to operate and can be carried out on all material compression mechanical test machines, it still has the following shortcomings on the whole: (1) Due to influence of an end loading zone, the accuracy of the measured tensile strength is still an unavoidable problem; (2) During a splitting process, it is difficult to ensure that the splitting surface must follow a predetermined loading surface; (3) There is no guarantee that a fracture surface must be a failure surface with the smallest bearing capacity, especially for rocks with obvious bedding and defects. Therefore, the tensile strength value measured by the indirect measurement can not fully reflect a real situation.

In order to solve the problem that results of the indirect tensile test can not fully reflect the real situation, the direct tensile method is used to test tensile mechanical properties of the rocks. However, the direct tensile method has higher requirements on a tensile function of a test apparatus, resulting in a failure to use an ordinary compression mechanical test machine for test and low applicability. In order to test the tensile mechanical properties of rocks under different conditions, the applicant combines a direct tensile function of the most advanced MTS815 rock mechanical test system in the world to solve part problems existing in the test, and has obtained a number of patents such as ZL200610022224.8, U.S. Pat. No. 7,624,647B2, ZL201510068200.5, ZL201510068186.9, U.S. Pat. No. 9,488,560B2 and U.S. Pat. No. 9,488,559B2. However, for the direct tensile test of rock mechanical properties, there are still the following shortcomings: (1) Performance requirements for a mechanical test apparatus are high, and the test is carried out in a conventional material test machine, so the universality of promotion is low; (2) An MTS815 test machine is utilized for the direct tensile test, and in the test process, disassembly and assembly of loading parts are very tedious and need cooperation of more than one person to complete, so the whole process is time-consuming and laborious; (3) The loading parts to be disassembled and assembled are all steel modules, which are large in volume and heavy in weight, and the disassembly process may cause serious safety hazards such as an apparatus damage or personnel injury; (4) The installation and test process of the direct tensile is complicated, which requires at least 2 persons to cooperate and still requires a lot of labor; (5) In the test, due to the need to use a plurality of loading pad blocks for piling and 2 long loading chains are respectively connected with 2 tensile ends of the rock, an eccentric tensile force is easy to appear which affects the test results; and (6) At present, it is impossible to realize a rock direct tensile test under triaxial lateral compression stresses, and it is also impossible to realize a rock direct tensile test under compression stresses directly applied in two axial directions.

BRIEF DESCRIPTION OF THE INVENTION

The purpose of the present invention is to provide a rock direct tensile test platform and method that can be tested on all material pressure test machines and is universally suitable for all material test machines, which can ensure a failure occurs along a part with a lowest bearing capacity of a sample, ensure measurement accuracy and reduce a test cost. It can be used for a rock tensile test under triaxial lateral compression stresses, and a rock direct tensile test under compression stresses directly applied in two loading axial directions.

The purpose of the present invention is realized as follows: a rock direct tensile test platform universally suitable for all material test machines, comprising a support frame, wherein a top of the support frame is fixed with a top plate, a bearing plate is provided above the top plate, the bearing plate is provided with a plurality of vertical force transferring rods, the force transferring rods vertically penetrate through the top plate and have a sliding fit with the top plate, lower ends of the force transferring rods are provided with a tensile base, a top of the tensile base is provided with a lower clamp holder, a bottom of the top plate is provided with an upper clamp holder, and a clamp center of the upper clamp holder coincides with a clamp center of the lower clamp holder.

Further, the support frame comprises a base and a plurality of vertical columns arranged on the base, and the top plate is fixed on upper parts of the vertical columns through first fixing nuts.

Further, the tensile base is fixed on lower ends of the force transferring rods through second fixing nuts.

Further, the tensile base is provided with a lower ball head sliding fitted with the tensile base, and the lower clamp holder is fixed on the lower ball head; and the top plate is provided with an upper ball head sliding fitted with the top plate, and the upper clamp holder is fixed on the upper ball head.

Further, the lower clamp holder is installed on the lower ball head through a lower latch, and the upper clamp holder is installed on the upper ball head through an upper latch.

In a test method of the rock tensile test device, one end of a sample is bonded to the lower clamp holder by strong glue, and the other end of the sample is bonded to the upper clamp holder by the strong glue; then the whole rock tensile test platform is placed on a material compression mechanical test machine, and a compression load is applied to the bearing plate by the material compression mechanical test machine, and the compression load is transferred to the tensile base through the force transferring rods; and the tensile base forms a tensile load on the sample, wherein a magnitude of the tensile load is equal to that of the compression load applied by the material compression mechanical test machine.

Further, the lower clamp holder and the upper clamp holder are removed before a test; during the test, one end of the sample is bonded to the lower clamp holder by the strong glue, and the other end of the sample is bonded to the upper clamp holder by the strong glue; then the upper clamp holder is connected to an upper ball head by using an upper latch, and the lower clamp holder is connected to a lower ball head by using a lower latch; then the whole rock tensile test platform is placed on the material compression mechanical test machine, and the compression load is applied to the bearing plate by the material compression mechanical test machine; and the compression load is transferred to the tensile base through the force transferring rods, and the tensile base forms the tensile load on the sample, wherein the size of the tensile load is equal to that of the compression load applied by the material compression mechanical test machine.

A test method of the rock direct tensile test platform, wherein one end of a sample is bonded to the lower clamp holder by strong glue, the other end of the sample is bonded to the upper clamp holder by the strong glue, an oil pressure protection heat shrink film is fixed on outer walls of the lower clamp holder, the sample and the upper clamp holder, then the whole rock tensile test device is placed in a pressure chamber, the pressure chamber is filled with oil to apply triaxial lateral compression stresses, a compression load is applied to the bearing plate through an indenter of a test machine, the compression load is transferred through the force transferring rods to the tensile base, and the tensile base forms a tensile load on the sample, wherein the tensile load is equal to that of a compression load applied by a material compression mechanical test machine; and when the sample is destroyed, the oil in the pressure chamber is pumped back.

A test method of the rock direct tensile test platform universally suitable for all material test machines, wherein a true triaxial loading test machine is used, the true triaxial loading test machine comprises a test platform, 4 horizontal supporting shafts are provided around the test platform, two adjacent supporting shafts are perpendicular to each other, one end of each supporting shaft away from the test platform is provided with a pressurized mechanism, the other end is provided with a vertical pressure plate; and an indenter is provided above the test platform;

one end of a sample with a rectangular cross section is bonded to the lower clamp holder by strong glue, and the other end of the sample is bonded to the upper clamp holder by the strong glue; then the whole rock direct tensile test platform is placed on a test platform of the true triaxial loading test machine to ensure that four side faces of the sample correspond to positions of the four pressure plates, and then the pressurized mechanism is utilized to apply pressure to the supporting shafts; the pressure is transferred to the sample through the pressure plates; then the indenter of the true triaxial loading test machine is utilized to apply a compression load to the bearing plate, and the compression load is transferred to the tensile base through the force transferring rods, and the tensile base forms a tensile load on the sample, wherein a magnitude of the tensile load is equal to that of a compression load applied by a material compression mechanical test machine.

Further, a side face of each pressure plate is provided with a high molecular weight polyethylene anti-friction pad.

The present invention has the following advantages: 1. The present invention can carry out the rock tensile test only by using a conventional material test machine, without adding a separate tensile test apparatus, and has wide universality, which overcomes the defect of high apparatus cost of the traditional direct tensile method.

2. The present invention adopts the direct tensile method of compression-rotary-tension, which can ensure the failure occurs along the part with the lowest bearing force of the sample, and overcome the defect of low accuracy of the traditional indirect tensile method.

3. The structure of the device is simple, which is mainly consisted of a steel structure; compared with a similar tensile test apparatus, the cost is low; it has a small size and a light weight, so it is easy to be moved; the operation is convenient and labor-saving, and one person can carry out the test, which reduces the use cost; it avoids accidents such as an accidental damage to the apparatus and personal safety of an operator due to disassembly of heavy loading parts, which has high safety; and the tensile structure is compact, which avoids an eccentric bearing force problem that may exist in the superposition of a plurality of parts.

4. Because the present invention has a compact structure and a small volume, it can be placed in the pressure chamber of the existing triaxial test machine, solving the problem that the rock direct tensile test cannot be carried out under the triaxial lateral stresses.

5. The present invention adopts a scaffold-type compression-rotary-tension device to solve the problem that the rock direct tensile test cannot be carried out in case that the compression stresses are directly applied in the directions of the other two loading axes, and can be used directly in combination with the existing true triaxial loading test machine to complete the rock tensile test in case that the compression stresses are directly applied in the directions of the other two loading axes.

Reference numbers: 1—base; 2—vertical column; 3—top plate; 4—first fixing nut; 5—bearing plate; 6—force transferring rod; 7—tensile base; 8—second fixing nut; 9—lower ball head; 10—lower latch; 11—lower clamp holder; 12—sample; 13—upper clamp holder; 14—upper latch; 15—upper ball head; 16—oil pressure protection heat shrink film; 17—high molecular weight polyethylene anti-friction pad; 18—pressure chamber; 19—rock direct tensile test platform; 20—true triaxial loading test machine; 21—supporting shaft; 22—pressure plate.

DETAILED DESCRIPTION OF EMBODIMENTS OF THE INVENTION

The present invention is further described with reference to the accompanying drawings and embodiments.

First Embodiment

Figure 1:
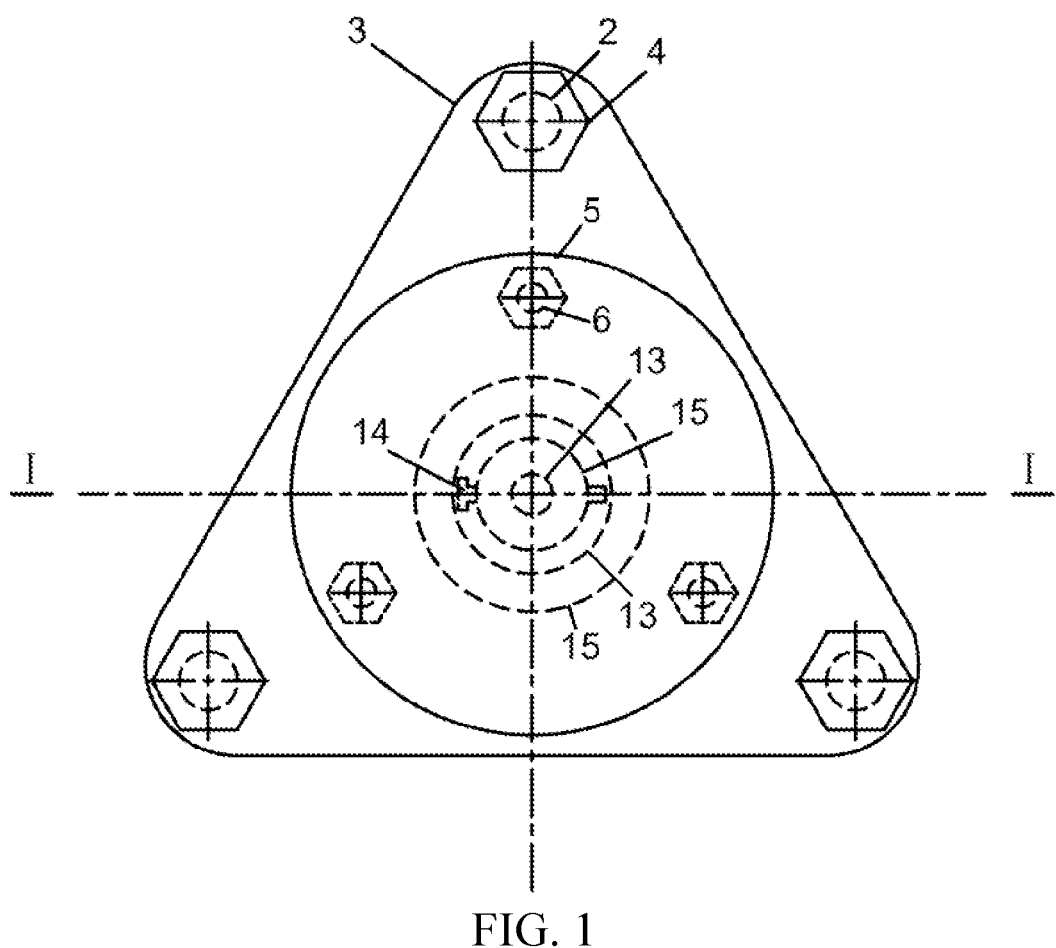
FIG. 1 is a schematic top view of a first embodiment of the present invention.

As shown in FIG. 1, a rock direct tensile test platform universally suitable for all material test machines of the present invention comprises a support frame, wherein a top of the support frame is fixed with a top plate 3, a bearing plate 5 is provided above the top plate 3, the bearing plate 5 is provided with a plurality of vertical force transferring rods 6, the force transferring rods 6 vertically penetrate through the top plate 3 and sliding fit with the top plate 3, lower ends of the force transferring rods 6 are provided with a tensile base 7, a top of the tensile base 7 is provided with a lower clamp holder 11, a bottom of the top plate 3 is provided with an upper clamp holder 13, and a clamp center of the upper clamp holder 13 coincides with a clamp center of the lower clamp holder 11.

The support frame is used to support other parts, and can adopt various structural frames. Preferably, the support frame comprises a base 1 and a plurality of vertical columns 2 arranged on the base 1, and the top plate 3 is fixed on upper parts of the vertical columns 2 through first fixing nuts 4. The base 1 adopts a metal plate of a certain thickness, and the vertical columns 2 may adopt cylindrical metal rods, which may be hollow tubes. Lower ends of the vertical columns 2 can be welded with the base 1, or a common connection method such as threaded fit can be used. Upper parts of the vertical columns 2 are provided with external threads, which can be positioned by setting the first fixing nuts 4 on upper and lower surfaces of the top plate 3. Alternatively, support steps can be arranged on outer walls of the upper parts of the vertical columns 2, the top plate 3 is placed on the support steps, and the first fixing nuts 4 are arranged on an upper surface of the top plate 3 to lock the top plate 3. The top plate 3 can be disassembled and installed, and the top plate 3 can be removed when being moved, which also facilitates adjustment of a height of the top plate 3.

Figure 2:
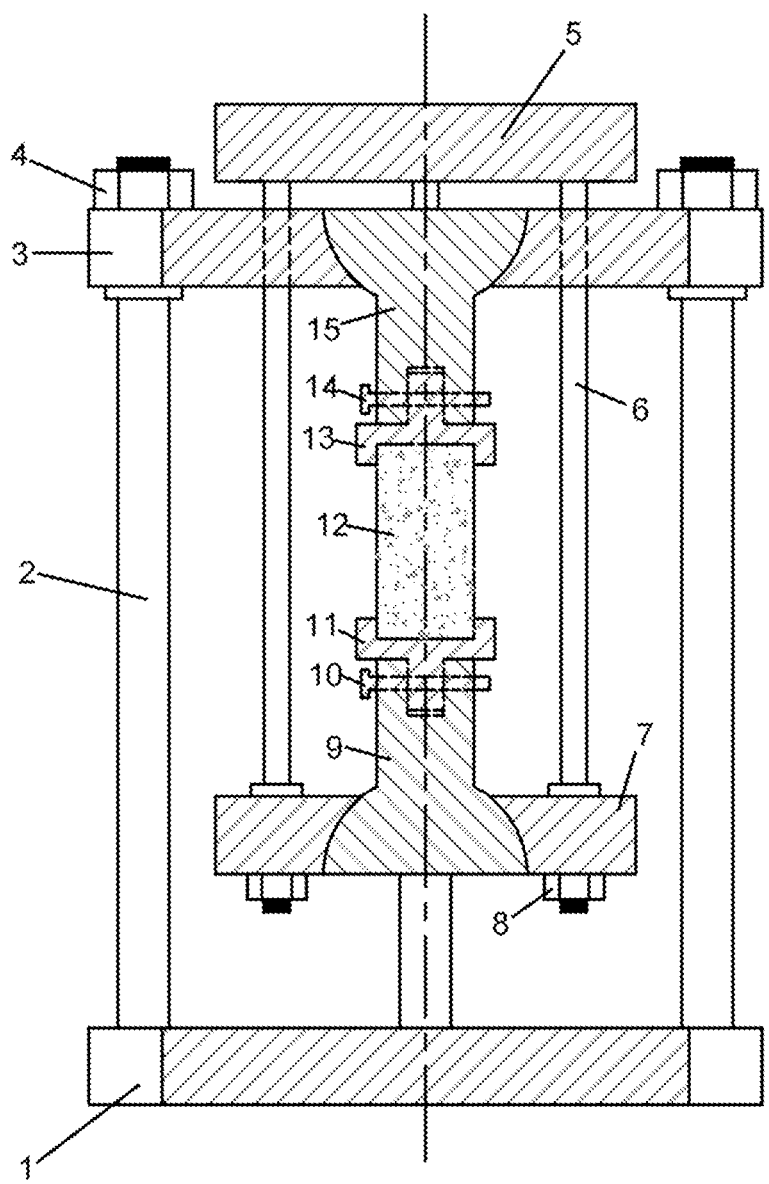
FIG. 2 is a schematic sectional diagram of I-I in FIG. 1.

The base 1 and top plate 3 can be a square, circular, triangle or other shapes, preferably the triangle with rounded angles as shown in FIG. 2. The number of vertical columns 2 can be 3, 4, etc., preferably 3, which can position the top plate 3 more stably and fix it better. A smaller number of vertical columns 2 are used, and space between the vertical columns 2 is larger, which reserves operational space so that it is convenient to install other measurement sensors on the rock sample to be tested.

The bearing plate 5 is directly subjected to a compression load. The bearing plate 5, the force transferring rods 6 and the tensile base 7 constitute a tensile frame which converts the compression load into a tensile load. Upper ends of the force transferring rods 6 can be welded with the bearing plate 5, or can be connected by threaded connections, screw connections or positioning latch connections. The bearing plate 5 and the tensile base 7 can be a triangular, rectangular or other shapes, preferably a circular, and there are 3 force transferring rods 6, which can realize stable load transfer and prevent a tilt of the tensile frame. The lower ends of the force transferring rods 6 are provided with external threads, and the tensile base 7 is fixed to the lower ends of the force transferring rods 6 through second fixing nuts 8 for easy disassembly.

The bearing plate 5 is located above the top plate 3, and a spacing between the bearing plate 5 and the top plate 3 is appropriate to ensure that the compression load of the bearing plate 5 can be transferred to the force transferring rods 6. The force transferring rods 6 and the top plate 3 are sliding fitted, and fit gaps are as small as possible to ensure that the compression load is transferred vertically downward along the force transferring rods 6.

The upper clamp holder 13 and the lower clamp holder 11 are used for clamping a rock sample 12. The upper clamp holder 13 and the lower clamp holder 11 are both provided with a clamping blind slot. The clamping blind slot may be a circular slot or a square slot depended on a shape of the sample 12. The upper clamp holder 13 and the lower clamp holder 11 may be installed directly on the top plate 3 and the tensile base 7, respectively. As a preferred implementation, the tensile base 7 is provided with a lower ball head 9 sliding fitted with the tensile base 7, and the lower clamp holder 11 is fixed on the lower ball head 9; and the top plate 3 is provided with an upper ball head 15 sliding fitted with the top plate 3, and the upper clamp holder 13 is fixed on the upper ball head 15.

The lower ball head 9 and the upper ball head 15 are both provided with a hemispherical curved surface, while the top plate 3 is provided with a groove matched with the curved surface of the upper ball head 15, the tensile base 7 is provided with a groove matched with the curved surface of the lower ball head 9, so that the lower ball head 9 and the upper ball head 15 can be flexibly rotated within a certain angle range. After the processing of the sample 12, it is impossible to completely ensure that two end faces are perpendicular to an axis of the sample 12. After the lower clamp holder 11 and the upper clamp holder 13 are bonded to upper and lower end faces of the sample 12 respectively, it would cause that an axis of the tensile load cannot completely coincide with the axis of the sample 12. If there is a certain included angle, it would lead to an eccentric load and affect results. After setting the lower ball head 9 and the upper ball head 15, if the axis of the tensile load deviates from the axis of the sample 12 during the test, the lower ball head 9 and the upper ball head 15 can automatically rotate under the action of the load, so that a load direction is consistent with the axial direction of the sample 12, so as to ensure the accuracy of the test results.

The lower clamp holder 11 can be welded to the lower ball head 9. Preferably, the lower clamp holder 11 is installed on the lower ball head 9 through a lower latch 10, and the upper clamp holder 13 is installed on the upper ball head 15 through an upper latch 14. A latch connection can be easily and quickly disassembled. In the test, the upper latch 14 and the lower latch 10 can be pulled out first, and the lower clamp holder 11 and the upper clamp holder 13 are removed. After the two ends of the sample 12 are fixed to the lower clamp holder 11 and the upper clamp holder 13 respectively, the lower clamp holder 11 and the upper clamp holder 13 are then connected to the lower ball head 9 and the upper ball head 15 respectively through the latches. In this way, the installation of sample 12 is more convenient, which can ensure that the installation of the sample 12 is stable and firm, and an installation position is in a high precision to ensure accuracy of measurement. Furthermore, the lower clamp holder 11 and the upper clamp holder 13 for fixing the samples 12 of different shapes and sizes can be replaced, so that the device can be used for tensile tests on the samples 12 of various shapes and sizes.

A test method of the above rock direct tensile test platform universally suitable for all material test machines are as follows:

One end of the sample 12 is bonded to the lower clamp holder 11 by the strong glue, and the other end of the sample 12 is bonded to the upper clamp holder 13 by the strong glue. A cross section of the sample 12 can be a circular, rectangular, oval or other shapes. The lower clamp holder 11 and the upper clamp holder 13 are prepared according to a shape and size of the sample 12. When fixing the sample 12, the lower clamp holder 11 and the upper clamp holder 13 may not be removed from the test device, but this would cause the operation to be not convenient, and adhesive strengths between the two ends of sample 12 and the clamp holders are difficult to be uniform. Therefore, preferably, the lower clamp holder 11 and the upper clamp holder 13 are removed before the test in the present invention. During the test, one end of the sample 12 is bonded to the lower clamp holder 11 by the strong glue, and the other end of the sample 12 is bonded to the upper clamp holder 13 by the strong glue. Then the upper clamp holder 13 is connected to the upper ball head 15 by using the upper latch 14, and the lower clamp holder 11 is connected to the lower ball head 9 by using the lower latch 10. Then the whole rock tensile test platform is placed on a material compression mechanical test machine, and the compression load is applied to the bearing plate 5 by the material compression mechanical test machine. The compression load is transferred to the tensile base 7 through the force transferring rods 6, and the tensile base 7 forms the tensile load on the sample 12, wherein a magnitude of the tensile load is equal to that of the compression load applied by the material compression mechanical test machine.

In the rock direct tensile test platform of the present invention, the compression load is converted into the tensile load through the tensile frame consisted of the bearing plate 5, force transferring rods 6 and the tensile base 7, and the load applied to the sample 12 is equivalent to a load in an existing direct tensile test, which can ensure a failure occurs along a part with the lowest bearing force of the sample and overcome the low accuracy of a traditional indirect tensile method.

Furthermore, the material compression mechanical test machine is a conventional test apparatus, and compression mechanical tests of a plurality of materials are carried out by using the material compression mechanical test machine to apply a load. The apparatus has a simple structure, a low threshold of operation, a low cost. Therefore, general small and medium-sized enterprises, research institutions and so on have the ability to buy and use, which overcomes defects of a high cost and high difficulty in operation of a traditional direct tensile test apparatus.

In addition, the present invention has a simple structure, a low cost, a compact structure and a small volume, and can be used in combination with conventional compression mechanical test machines for rock tensile tests under a plurality of conditions.

Second Embodiment

Figure 3:
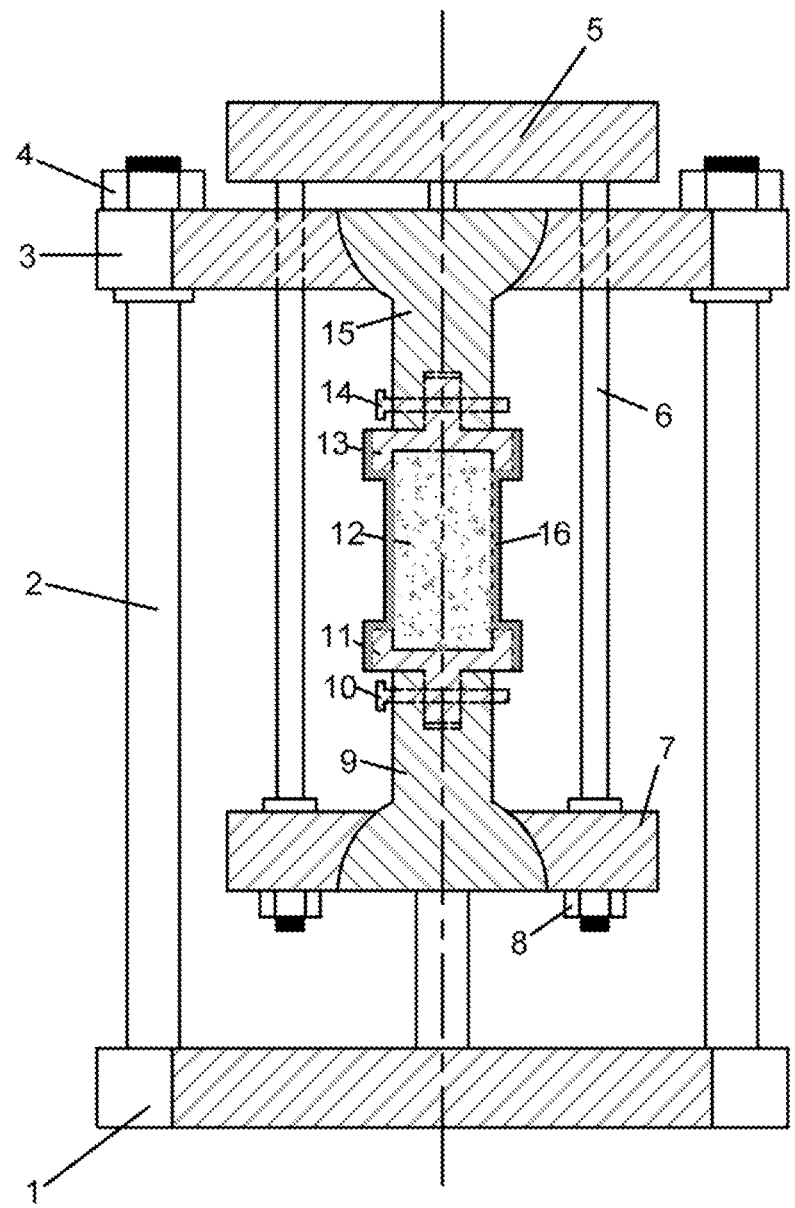
FIG. 3 and FIG. 4 are schematic diagrams of a second embodiment of the present invention.
Figure 4:
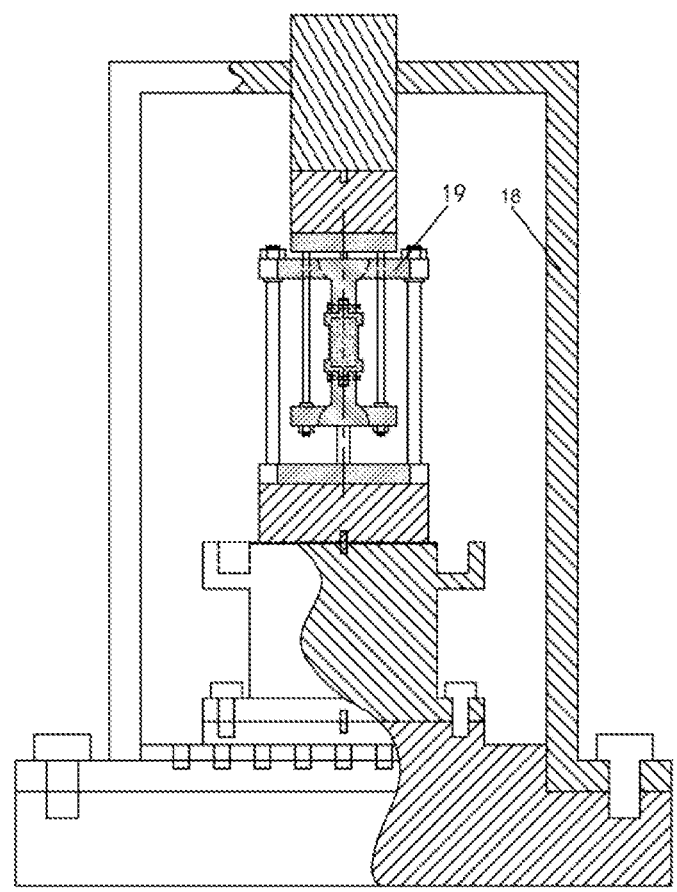

A test platform of this embodiment, as shown in FIG. 3 and FIG. 4, comprises the rock direct tensile test platform 19 of the first embodiment and a conventional triaxial test machine. The triaxial test machine comprises a pressure chamber 18, a top of which is provided with an indenter.

During the test, the sample 12 is prepared by using the rock; and one end of the sample 12 is bonded to the lower clamp holder 11 by the strong glue, the other end of the sample 12 is bonded to the upper clamp holder 13 by the strong glue, and an oil pressure protection heat shrink film 16 is fixed on outer walls of the lower clamp holder 11, the sample 12 and the upper clamp holder 13.

When fixing the sample 12, the lower clamp holder 11 and the upper clamp holder 13 can also be removed first, and the lower clamp holder 11 and the upper clamp holder 13 can be fixed to the lower ball head 9 and the upper ball head 15 respectively after the sample 12 is firmly bonded.

Then, the whole rock direct tensile test platform 19 is placed on the base inside the pressure chamber 18 to ensure that the bearing plate 5 of the rock direct tensile test platform 19 can be in good contact with the indenter of the triaxial test machine, and the rock direct tensile test platform 19 is fixed by bolts. The pressure chamber 18 is filled with oil to apply the triaxial lateral compression stresses to target values, and the compression load is applied to the bearing plate 5 through an indenter of the test machine. The compression load is transferred to the tensile base 7 through the force transferring rods 6, and the tensile base 7 forms the tensile load on the sample 12, and the size of the tensile load is equal to that of the compression load applied by the material compression mechanical test machine. When the sample 12 is destroyed, the oil in the pressure chamber 18 is pumped back.

This embodiment can realize the rock tensile test under the condition of triaxial lateral pressure, solving the problem that the traditional rock direct tensile test cannot be carried out under the triaxial lateral stresses, and the operation is also very convenient, without complicated disassembly and installation, and only one person can carry out the test.

Third Embodiment

Figure 5:
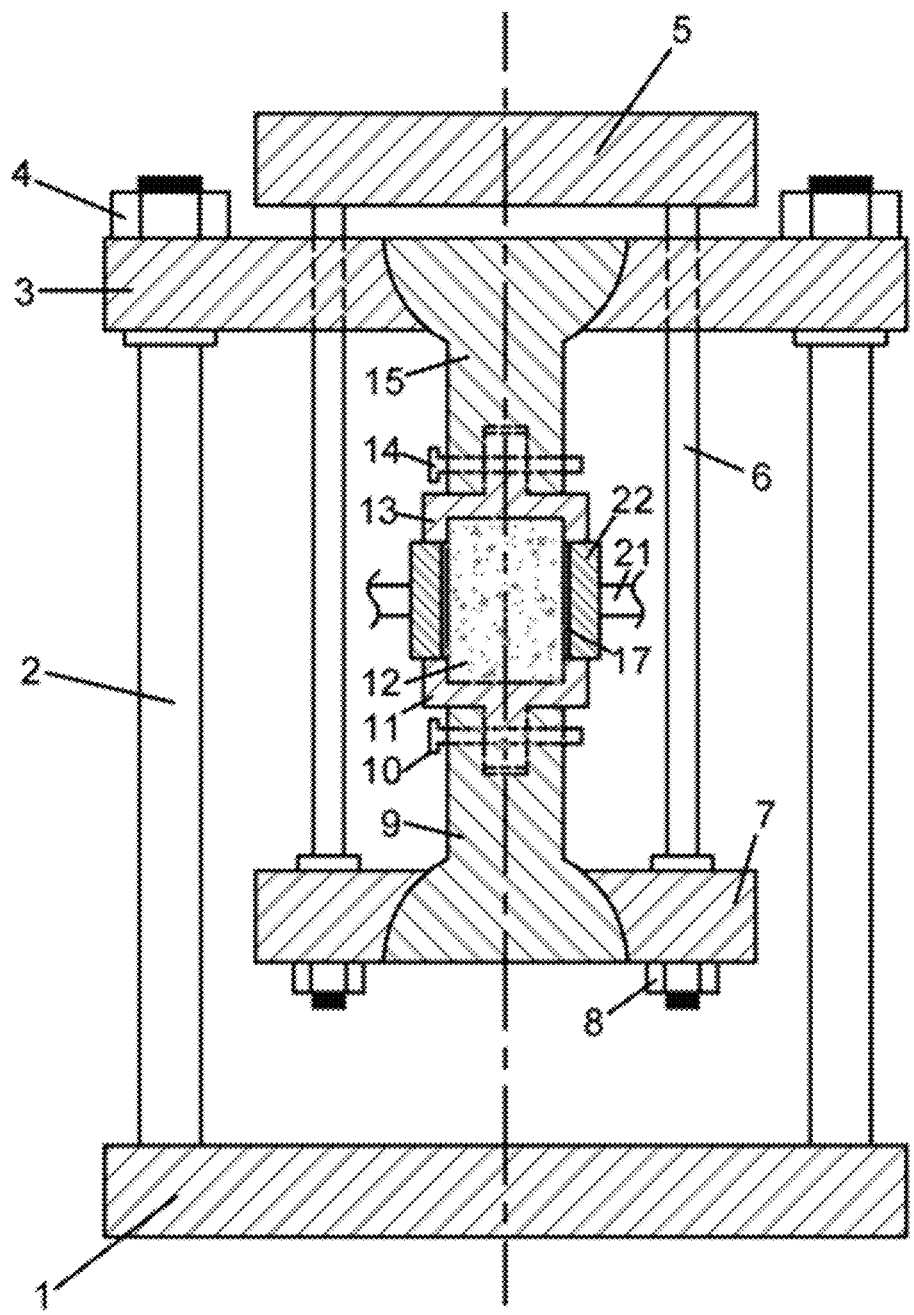
FIG. 5 and FIG. 6 are schematic diagrams of a third embodiment.
Figure 6:
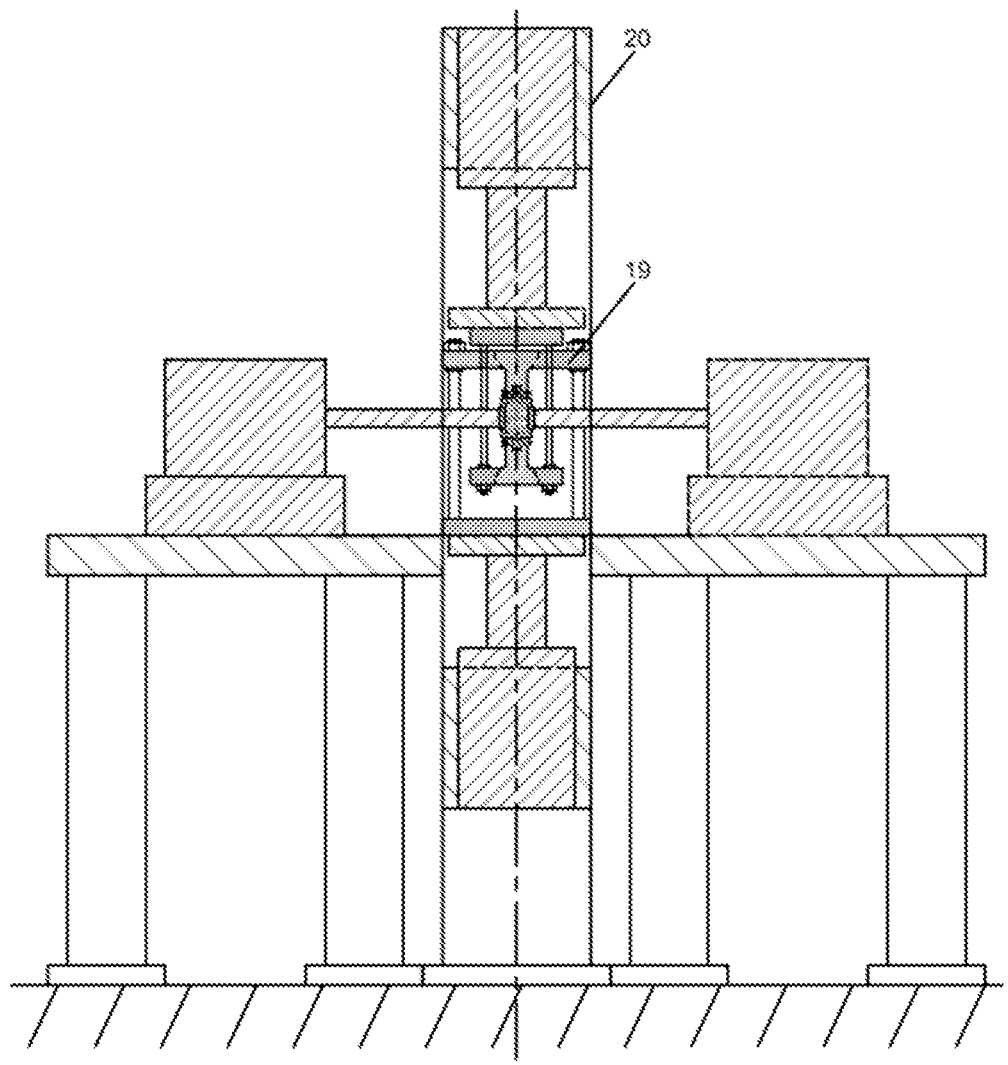

A test platform of this embodiment is shown in FIG. 5 and FIG. 6, which comprises the rock tensile test device 19 of the first embodiment and a conventional true triaxial loading test machine 20, wherein the true triaxial loading test machine 20 comprises a test platform, 4 horizontal supporting shafts 21 are provided around the test platform, two adjacent supporting shafts 21 are perpendicular to each other, one end of each supporting shaft 21 away from the test platform is provided with a pressurized mechanism, the other end is provided with a vertical pressure plate 22; and an indenter is provided above the test platform.

During the test, a sample 12 with a rectangular cross section is prepared. One end of the sample 12 is bonded to the lower clamp holder 11 by the strong glue, and the other end of the sample 12 is bonded to the upper clamp holder 13 by the strong glue. When fixing the sample 12, the lower clamp holder 11 and the upper clamp holder 13 can also be removed first, and the lower clamp holder 11 and the upper clamp holder 13 can be fixed to the lower ball head 9 and the upper ball head 15 respectively after the sample 12 is firmly bonded. In order to facilitate operation, adhesive forces of end faces of the sample 12 are balanced at the same time.

Then, the whole rock direct tensile test platform 19 is placed on the test platform of the true triaxial loading test machine 20 to ensure that four side faces of the sample 12 correspond to the positions of the four pressure plates 22, that is, to ensure that each pressure plate 22 can fit one side face of the sample 12, and then the pressure mechanism is used to apply the pressure to the supporting shafts 21, and the pressure is transferred to the sample 12 through the pressure plates 22. Then, the compression load is applied to the bearing plate 5 by the indenter of the true triaxial loading test machine 20, and the compression load is transferred to the tensile base 7 through the force transferring rods 6, and the tensile base 7 forms the tensile load on the sample 12, wherein the size of the tensile load is equal to that of the compression load applied by the material compression mechanical test machine. When the sample 12 is destroyed, three axial forces of the true triaxial loading test machine 20 are removed, and the sample 12 can be taken out.

In order to protect the side faces of the sample 12 and prevent the side faces of the sample 12 from being damaged or prevent from affecting the test accuracy due to the uneven load between the side faces of the pressure plates 22 and the side faces of the sample 12 or the friction effect between the side faces of the pressure plates and the side faces of the sample, the high molecular weight polyethylene anti-friction pad 17 is arranged on the side faces of the pressure plates 22 facing the side faces of the sample 12.

This embodiment can carry out the rock direct tensile test under two axial compression stresses, which solves the problem that the rock direct tensile test cannot be carried out under the compression stresses directly applied in directions of the other two loading axes. Moreover, the operation is simple and convenient. By placing the rock direct tensile test platform 19 of the first embodiment into the test platform of the true triaxial loading testing machine 20, the rock tensile test under two axial compression stresses can be carried out without complicated disassembly and installation, and only one person can carry out the test, saving manpower and material resources.

In summary, the present invention can guarantee the test accuracy, reduce the apparatus cost, simplify the test operation, and realize the rock direct tensile test under a plurality of conditions.

The above are preferred embodiments of the present invention only and are not intended to limit the present invention. For a person skilled in the art, the present invention is subject to various changes and variations. Any modifications, equivalent substitutions, improvements, and the like within the spirit and principles of the invention are intended to be included within the scope of the present invention.

The invention claimed is:

1. A rock direct tensile test platform universally suitable for all material test machines, comprising a support frame, wherein a top of the support frame is fixed with a top plate (3), a bearing plate (5) is provided above the top plate (3), the bearing plate (5) is provided with a plurality of vertical force transferring rods (6), the force transferring rods (6) vertically extend through the top plate (3) and have a sliding fit with the top plate (3), lower ends of the force transferring rods (6) are provided with a tensile base (7), a top of the tensile base (7) is provided with a lower clamp holder (11), a bottom of the top plate (3) is provided with an upper clamp holder (13), and a clamp center of the upper clamp holder (13) coincides with a clamp center of the lower clamp holder (11), wherein the tensile base (7) is provided with a lower ball head (9) sliding fitted with the tensile base (7), and the lower clamp holder (11) is affixed to the lower ball head (9); and the top plate (3) is provided with an upper ball head (15) sliding fitted with the top plate (3), and the upper clamp holder (13) is affixed to the upper ball head (15).

2. The rock direct tensile test platform universally suitable for all material test machines according to claim 1, wherein the support frame comprises a base (1) and a plurality of vertical columns (2) arranged on the base (1), and the top plate (3) is affixed to upper parts of the plurality of vertical columns (2) through first fixing nuts (4).

3. The rock direct tensile test platform universally suitable for all material test machines according to claim 1, wherein the tensile base (7) is affixed to lower ends of the force transferring rods (6) through second fixing nuts (8).

4. The rock direct tensile test platform universally suitable for all material test machines according to claim 1, wherein the lower clamp holder (11) is installed on the lower ball head (9) through a lower latch (10), and the upper clamp holder (13) is installed on the upper ball head (15) through an upper latch (14).

5. A test method of the rock direct tensile test platform universally suitable for all material test machines according to claim 1, wherein one end of a sample (12) is bonded to the lower clamp holder (11) by a glue, and the other end of the sample (12) is bonded to the upper clamp holder (13) by the glue; then the whole rock tensile test device is placed on a material compression mechanical test machine, and a compression load is applied to the bearing plate (5) by the material compression mechanical test machine, and the compression load is transferred to the tensile base (7) through the force transferring rods (6); and the tensile base (7) forms a tensile load on the sample (12), wherein a magnitude of the tensile load is equal to that of the compression load applied by the material compression mechanical test machine.

6. The test method of the rock direct tensile test platform universally suitable for all material test machines according to claim 5, wherein the lower clamp holder (11) and the upper clamp holder (13) are removed before a test; during the test, one end of the sample (12) is bonded to the lower clamp holder (11) by the glue, and the other end of the sample (12) is bonded to the upper clamp holder (13) by the glue; then the upper clamp holder (13) is connected to an upper ball head (15) by using an upper latch (14), and the lower clamp holder (11) is connected to a lower ball head (9) by using a lower latch (10); then the whole rock tensile test device is placed on the material compression mechanical test machine, and the compression load is applied to the bearing plate (5) by the material compression mechanical test machine; and the compression load is transferred to the tensile base (7) through the force transferring rods (6), and the tensile base (7) forms the tensile load on the sample (12), wherein the size of the tensile load is equal to that of the compression load applied by the material compression mechanical test machine.

7. A test method of the rock direct tensile test platform universally suitable for all material test machines according to claim 1, wherein one end of a sample (12) is bonded to the lower clamp holder (11) by a glue, the other end of the sample (12) is bonded to the upper clamp holder (13) by the glue, an oil pressure protection heat shrink film (16) is fixed on outer walls of the lower clamp holder (11), the sample (12) and the upper clamp holder (13), then the whole rock tensile test device is placed in a pressure chamber (18), the pressure chamber is filled with oil to apply triaxial lateral compression stresses, a compression load is applied to the bearing plate (5) through an indenter of a test machine, the compression load is transferred through the force transferring rods (6) to the tensile base (7), and the tensile base (7) forms a tensile load on the sample (12), wherein the tensile load is equal to that of a compression load applied by a material compression mechanical test machine; and when the sample (12) is destroyed, the oil in the pressure chamber (18) is pumped back.

8. A test method of the rock direct tensile test platform universally suitable for all material test machines according to claim 1, wherein a true triaxial loading test machine (20) is used, the true triaxial loading test machine (20) comprises a test platform, 4 horizontal supporting shafts (21) are provided around the test platform, two adjacent supporting shafts (21) are perpendicular to each other, one end of each supporting shaft (21) away from the test platform is provided with a pressurized mechanism, the other end is provided with a vertical pressure plate (22); and an indenter is provided above the test platform;

one end of a sample (12) with a rectangular cross section is bonded to the lower clamp holder (11) by a glue, and the other end of the sample (12) is bonded to an upper clamp holder (13) by the glue; then the whole rock direct tensile test platform is placed on the test platform of the true triaxial loading test machine (20) to ensure that four side faces of the sample (12) correspond to positions of the four pressure plates (22), and then the pressurized mechanism is utilized to apply pressure to the supporting shafts (21); the pressure is transferred to the sample (12) through the pressure plates (22); then the indenter of the true triaxial loading test machine (20) is utilized to apply a compression load to the bearing plate (5), and the compression load is transferred to the tensile base (7) through the force transferring rods (6), and the tensile base (7) forms a tensile load on the sample (12), wherein a magnitude of the tensile load is equal to that of a compression load applied by a material compression mechanical test machine.

9. The test method of the rock direct tensile test platform universally suitable for all material test machines according to claim 8, wherein a side face of each pressure plate (22) is provided with a polyethylene anti-friction pad (17).

* * * * *